United States Patent
Hanes et al.

(10) Patent No.: US 9,357,011 B2
(45) Date of Patent: *May 31, 2016

(54) SYSTEM AND METHOD FOR INFORMATION HANDLING SYSTEM IMAGE NETWORK COMMUNICATION

(71) Applicant: Dell Products L.P., Round Rock, TX (US)

(72) Inventors: Kevin Hanes, Round Rock, TX (US); Tim Cox, Austin, TX (US); Marc Jarvis, Belton, TX (US); Chandar Kamalanathan, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/593,362

(22) Filed: Jan. 9, 2015

(65) Prior Publication Data
US 2015/0120894 A1     Apr. 30, 2015

Related U.S. Application Data

(63) Continuation of application No. 11/113,499, filed on Apr. 25, 2005, now Pat. No. 8,949,388.

(51) Int. Cl.
| | |
|---|---|
| G06F 15/177 | (2006.01) |
| H04L 29/08 | (2006.01) |
| G06T 7/00 | (2006.01) |

(52) U.S. Cl.
CPC .............. *H04L 67/12* (2013.01); *G06T 7/001* (2013.01)

(58) Field of Classification Search
CPC ............................... G06T 7/001; H04L 67/12

USPC .......................................................... 709/222
See application file for complete search history.

(56) References Cited

U.S. PATENT DOCUMENTS

| | | | |
|---|---|---|---|
| 5,692,190 A | 11/1997 | Williams | |
| 5,754,190 A * | 5/1998 | Dutton | G06T 9/001 345/473 |
| 5,995,757 A | 11/1999 | Amberg et al. | |
| 6,080,207 A | 6/2000 | Kroening et al. | |
| 6,178,546 B1 | 1/2001 | McIntyre | |
| 6,247,128 B1 * | 6/2001 | Fisher | G06F 8/63 713/1 |
| 6,282,711 B1 | 8/2001 | Halpern et al. | |
| 6,301,707 B1 | 10/2001 | Carroll et al. | |
| 6,505,094 B2 | 1/2003 | Pape et al. | |
| 6,658,563 B1 | 12/2003 | Ice et al. | |
| 6,775,829 B1 | 8/2004 | Kroening | |
| 6,789,109 B2 | 9/2004 | Samra et al. | |
| 6,823,508 B1 | 11/2004 | Burkhardt et al. | |
| 6,928,644 B1 | 8/2005 | Kroening et al. | |

(Continued)

*Primary Examiner* — Anthony Mejia
(74) *Attorney, Agent, or Firm* — Terrile, Cannatti, Chambers & Holland, LLP; Robert W. Holland (57) ABSTRACT

A system for manufacture of information handling systems is disclosed. The system includes an image analyzer operable to accept an image and generate an image traits definition wherein the image traits definition has a manifest of the image's software characteristics and customization settings, a remote image rebuilder distal to and interfaced with the image analyzer through a network wherein the remote image rebuilder operable to apply the image traits definition to an image components library to rebuild the image, and an information handling system burn rack proximate to the image rebuilder and operable to copy the rebuilt image to a manufactured information handling system.

20 Claims, 6 Drawing Sheets

(56) References Cited

U.S. PATENT DOCUMENTS

| | | | |
|---|---|---|---|
| 7,032,011 B2 | 4/2006 | Woodard et al. | |
| 7,117,256 B1 * | 10/2006 | Blinn | H04N 21/4122 375/E7.011 |
| 7,356,679 B1 * | 4/2008 | Le | G06F 17/30067 707/E17.01 |
| 7,774,369 B2 * | 8/2010 | Herzog | G06Q 10/10 707/793 |
| 2003/0097427 A1 | 5/2003 | Parry | |
| 2003/0220944 A1 | 11/2003 | Lyman Schottland et al. | |
| 2004/0025155 A1 | 2/2004 | Sedlack et al. | |
| 2004/0148601 A1 * | 7/2004 | Kroening | G06F 8/61 717/177 |
| 2004/0205172 A1 | 10/2004 | Kim | |
| 2004/0243998 A1 | 12/2004 | Collins et al. | |
| 2005/0055688 A1 | 3/2005 | Barajas et al. | |
| 2005/0144617 A1 | 6/2005 | Chefalas et al. | |
| 2005/0198628 A1 * | 9/2005 | Graham | G06F 8/64 717/174 |
| 2005/0283456 A1 * | 12/2005 | Graham | G06F 11/1435 |
| 2005/0283636 A1 | 12/2005 | Vasudevan et al. | |
| 2006/0031434 A1 * | 2/2006 | Tindal | H04L 41/0226 709/220 |
| 2006/0173993 A1 | 8/2006 | Henseler et al. | |
| 2007/0038992 A1 | 2/2007 | Mahasintunan | |
| 2008/0007768 A1 * | 1/2008 | Cho | G03G 15/5087 358/1.15 |
| 2010/0088194 A1 * | 4/2010 | Sierer | G06Q 20/10 705/26.1 |

* cited by examiner

*Figure 1*

```
<RequestJob GUID="XX" LOB="XX" JobID="XX" JobType="XX" MODEL="XX">
    <OS Name="XX" Path="XX"/>
    -<OSAPPS>
        <APP Name="XX" Path="XX"/>
    </OSAPPS>
    -<CUSTAPPS>
        <CAPPS Name="XX" Path="XX"/>
    </CUSTAPPS>
    -<OSSERVICEPACKS>
        <OSSP Name="XX" Path="XX"
        InstallCommand="XX"/>
    </OSSERVICEPACKS>
    -<OSPATCHES>
        <OSPATH Name="XX" Path="XX"
        InstallCommand="XX"/>
        <OSPATH Name="XX" Path="XX"
        InstallCommand="XX"/>
        <OSPATH Name="XX" Path="XX"
        InstallCommand="XX"/>
        <OSPATH Name="XX" Path="XX"
        InstallCommand="XX"/>
    </OSPATCHES>
    -<CustomConfig>
```

*Figure 2A*

```
<command type="XX" value="XX"/>
<command type="XX"
    value="XX="/>
<command type="XX"
    value="XX=="/>
<command type="XX"
    value="X+"/>
<command type="XX"
    value="XX="/>
<command type="XX"
    value="XX"/>
<command type ="XX"
    value="XX+"/>
<command type ="XX"
    value="XX="/>
</CustomConfig>
<Reg>XX==</Reg>
-<DeskTopSettings>
    <Background ImagePath="XX"/>
    </DeskTopSettings>
<RequestJob>
```

SYSTEM AND METHOD FOR INFORMATION HANDLING SYSTEM IMAGE NETWORK COMMUNICATION

BACKGROUND OF THE INVENTION

1. Field of the Invention

The present invention relates in general to the field of information handling system manufacture, and more particularly to a system and method for information handling system image communication over a network to a manufacture location.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Businesses often order multiple numbers of information handling systems for manufacture with predetermined software configurations so that the information handling systems will arrive at the business ready for use. The software configurations generally include specified operating systems and applications as well as customization settings, such as hard disc drive partitions, network settings, application settings, user profiles and data, and even desktop settings. In some instances, businesses will prepare an image of a hard disc drive having the desired software configuration and will provide the image to the information handling system manufacturer for copying to manufactured information handling systems. The businesses will send the image to the information handling system manufacturer who, in turn, sends the image to various development and fulfillment centers for manufacture preparation. Once the business image is tested and prepared for promotion to the factory, the image is sent to the manufacture location for copying to manufactured information handling systems. The manufactured information handling systems are then sent to the business with the desired image ready to interact with the business' information technology environment.

One difficulty with the manufacture of information handling systems using customer images is that the images are generally large in size and thus take considerable time to transfer by network communication. For instance, a typical notebook information handling system image has multiple gigabytes of information and takes hours to communicate through networks to overseas manufacturing sites. Additional delays are often introduced by the initial communication of the image from the customer to the manufacturer and communication of the image within various manufacturer development and fulfillment centers for testing and manufacture preparation. Further, storage of images at various manufacture centers consumes considerable memory resources for the extended time period during which the images are communicated, tested and used. Overall, the manufacture of information handling systems with images provided by customers and communicated by networks through the manufacturer centers generally imposes relatively high storage, network and management costs, as well as decreased customer satisfaction due to delays in manufacture and delivery of ordered information handling systems.

SUMMARY OF THE INVENTION

Therefore a need has arisen for a system and method which more efficiently communicates information handling system images over networks for manufacture of information handling systems with an image.

In accordance with the present invention, a system and method are provided which substantially reduce the disadvantages and problems associated with previous methods and systems for manufacture of information handling systems with an image. An image is analyzed to identify a traits definition that allows re-creation of the image, and the traits definition is communicated over a network to a manufacture location. The traits definition is applied at the manufacture location to re-create the image for copying to an information handling system.

More specifically, an order site image analyzer accepts an image from a customer site and analyzes the image to identify the operating system, applications and unique information, such as registry settings and application forms and templates. An image decompressor decompresses the image for analysis by a settings engine, mapping engine and application engine that create an image traits definition XML file. For instance, the image traits definition has a schema with elements to identify the operating system including service packs and patches, the applications including forms and templates, registry settings including video resolution, network and power management settings, and other custom configuration information including hard disc drive partitions, computer name, local account, domain name, modem and desktop settings. The image traits definition is communicated by a network to a distal manufacture site image rebuilder that re-creates the image from an image component library and the unique information. The re-created image is then copied to manufactured information handling systems to ship to the customer that ordered the image. In one embodiment, the image analyzer resides at the customer site to create the image traits definition at the customer site for communication to the manufacturer, thus reducing customer use of network resources to communicate an image to a manufacturer for manufacture of an information handling system.

The present invention provides a number of important technical advantages. One example of an important technical advantage is that substantially less information is actually communicated in the transfer of an image traits definition than an entire image. The image traits definition essentially represents an image DNA that allows reproduction of a cloned image at the manufacture site with traits defined by an original image. An information handling system is built with the cloned image in substantially less time since the delays of communication of the entire image are not experienced. Further, overhead costs of network and storage capacity are substantially reduced due to the reduced size of the image traits definition compared against the size of the complete image.

For example, a common portable information handling system image has a size of multiple gigabytes while the traits definition for that image has a size of around 20 kilobytes.

In one embodiment, the invention relates to a system for manufacture of information handling systems. The system includes an image analyzer operable to accept an image and generate an image traits definition wherein the image traits definition has a manifest of the image's software characteristics and customization settings, a remote image rebuilder distal to and interfaced with the image analyzer through a network wherein the remote image rebuilder operable to apply the image traits definition to an image components library to rebuild the image, and an information handling system burn rack proximate to the image rebuilder and operable to copy the rebuilt image to a manufactured information handling system.

In another embodiment, the invention relates to a method for manufacture of an information handling system having an image. The method includes creating the image to have an operating system, plural applications and unique information, analyzing the image to create an image traits definition that identifies the operating system, plural applications and unique information, communicating the image traits definition over a network to a remote information handling system manufacture site, re-creating the image from the image traits definition and a component library having the operating system and plural applications, and copying the re-created image to a manufactured information handling system.

In another embodiment, the invention relates to a method for manufacture of an information handling system with an image. The method includes analyzing the image to create an image traits definition XML file, the image traits definition identifying the image operating system, applications and unique settings, communicating the image traits definition over a network to a remote manufacture site, re-creating the image at the manufacture site with the image traits definition, and copying the re-created image to an information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Manufacture of information handling systems with an image is performed with consumption of less network and memory resources by creating an image traits definition, communicating the traits definition to a distal manufacturing site and re-creating the image from the traits definition for copying to manufactured information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
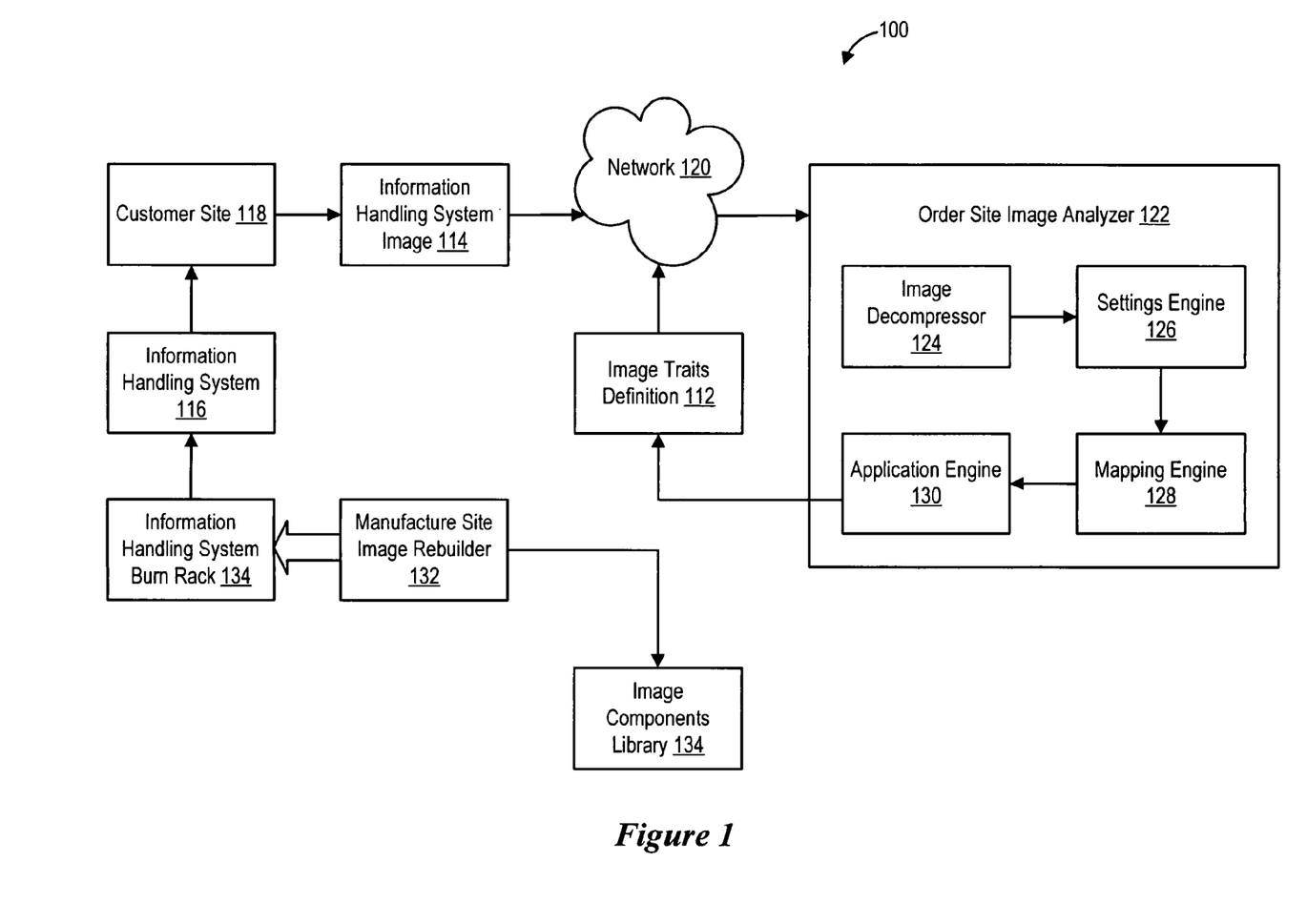
FIG. 1 depicts a block diagram of a system for creation of an image traits definition, communication of the traits definition to a distal location and re-creation of the image from the traits definition for manufacture of an information handling system.

Referring now to FIG. 1, a block diagram depicts a system 10 for creation of an image traits definition 112 from an information handling system image 114, communication of traits definition 112 to a distal location and re-creation of image 114 from traits definition 112 for manufacture of an information handling system 116. Information handling system image 114 is created by a customer at a customer site 118 to meet that customer's specific goals by including a desired operating system, desired applications and unique information. The unique information generally configures information handling system 116 to interact with customer site 118 in a desired manner and includes configuration information as well as forms and templates for the applications. The configuration information defines the operational parameters of information handling system 116, such as the hard disc drive partitions, power management and video resolution, the user profile such as the owner and computer name, the network settings such as the location, domain and modem settings, and the desktop settings. Typically, customers configure images for ordered information handling systems so that the systems as delivered by the manufacturer to customer site 118 are prepared to enter an operational state with little delay or customer site manipulation. Information handling system image 114 is then communicated by network 120, such as the Internet, to a manufacturer order site for testing and copying to manufactured information handling systems.

Figure 2A:
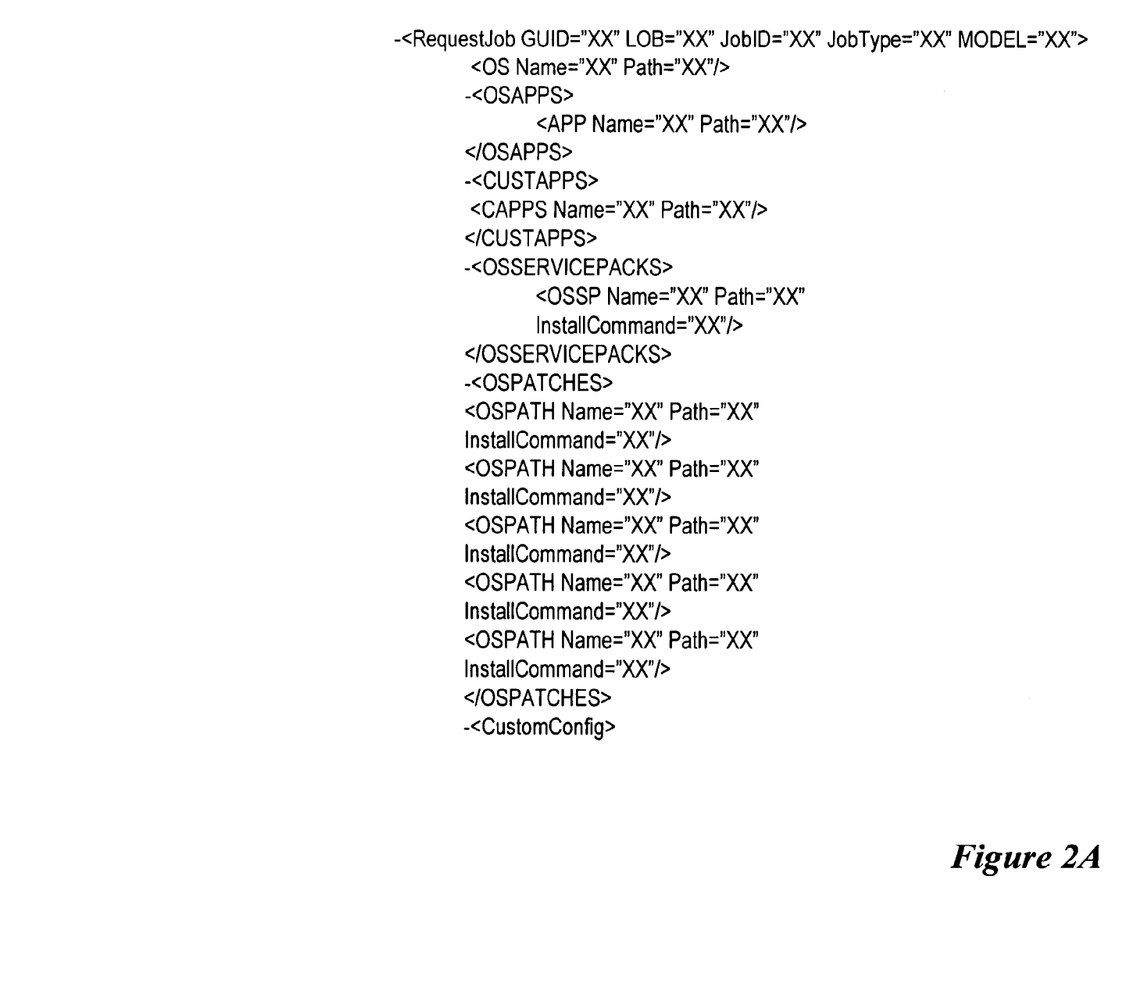
FIGS. 2A and 2B (referred to herein as FIG. 2) depict an example of an XML schema for an image traits definition.
Figure 2B:
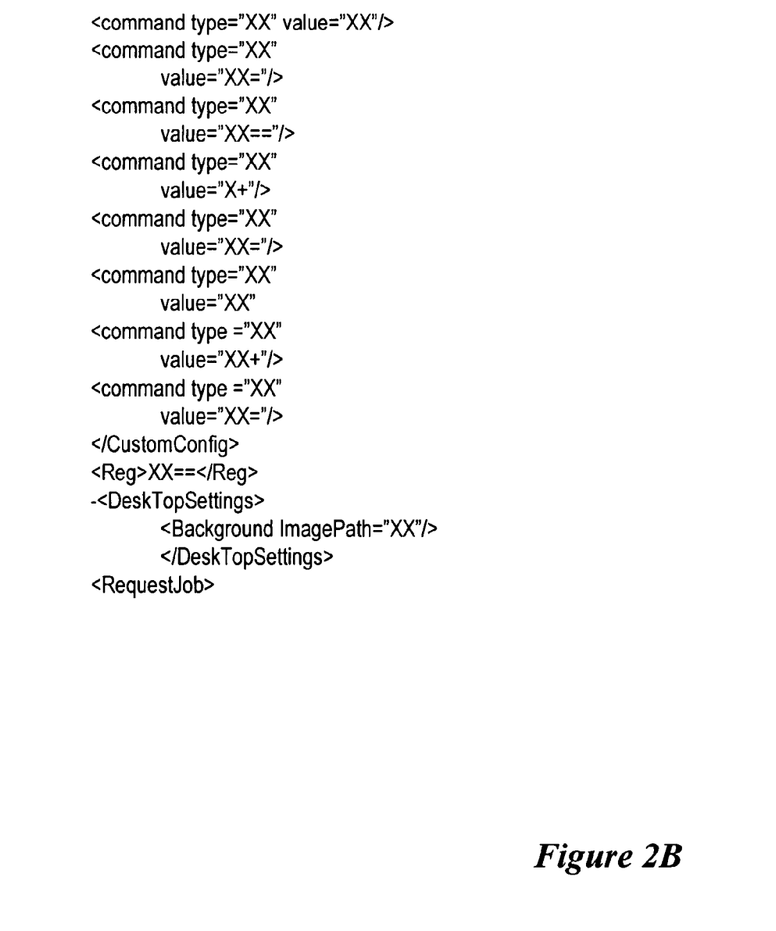

Customer images are accepted from network 120 by an order site image analyzer 122, which analyzes the images to identify the operating system, applications and unique information for creation of image traits definition 112. An image decompressor 124 decompresses the image to its installed form for analysis by a settings engine 126. Settings engine 126 determines the operating system and applications of the image and extracts the custom configuration information. For instance a registry template finds settings from the operating system registry, such as the video resolution, network and power management settings. A mapping engine 128 maps settings from any outdated configurations to up-to-date configurations. For instance, operating system upgrades, patches and service packs that alter registry settings from earlier operating system versions are mapped to the earlier versions so that image traits definition 112 will support an image having an updated operating system. An application engine 130 analyzes the decompressed image to identify unique information associated with applications, such as forms and templates. Order site image analyzer 122 then saves the identified information to an image traits definition having Extensible Markup Language (XML) schema such as that depicted by FIG. 2. The XML schema includes elements adequate to support re-creation of information handling system 114, such as the operating system name, the customer applications, the operating system service packs and patches, custom configuration information and desktop settings.

Once order site image analyzer 122 creates image traits definition XML file 112, image traits definition 112 is sent through network 120, such as the Internet, to a manufacture site image rebuilder 132. Manufacture site image rebuilder 132 reads the attributes from the XML schema of image traits definition 112 to re-create information handling system 114. The software components for the image re-creation, such as the operating system and applications, are called from an image components library 134 and populated with the custom configuration and other unique information of image traits definition 112. The re-created image is then provided to an information handling system burn rack 134 for copying to manufactured information handling system 116. By identifying the "DNA" of the image, image traits definition 112 substantially reduces the amount of information that is communicated in order to transfer an image 114 across a network 120. In alternative embodiments, image analyzer 122 may be located at customer site 118 so that the customer communicates the image traits definition 112 to order information handling systems having image 114. In such an embodiment, the manufacturer distributes image rebuilder 132 at the various manufacturer sites that use the full image, such as for testing.

Figure 3:
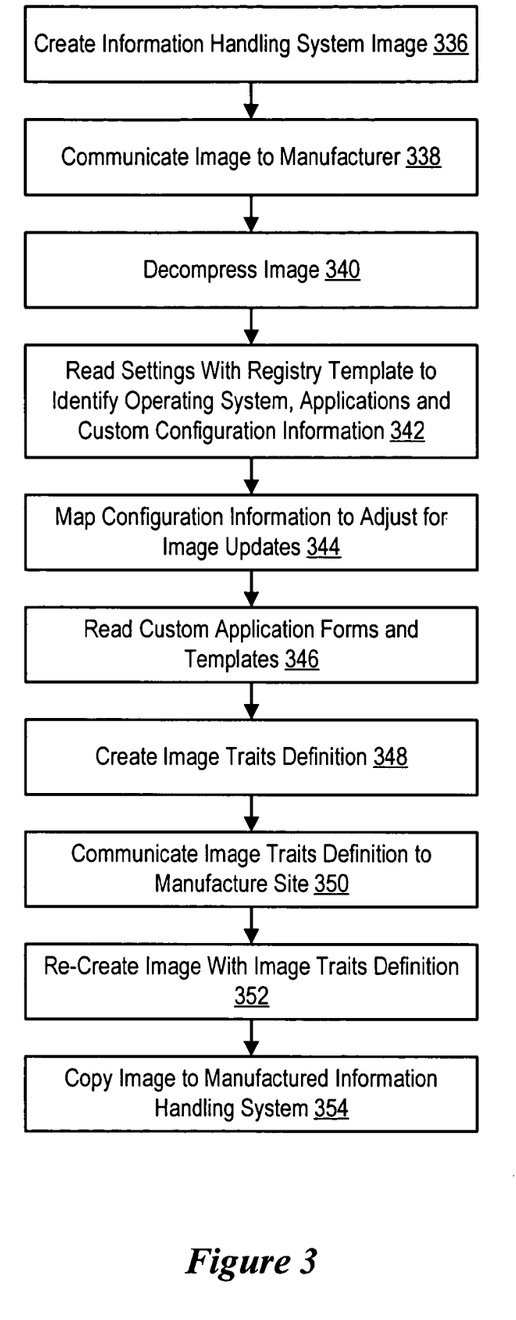
FIG. 3 depicts a flow diagram of a process for manufacture of an information handling system with an image traits definition.

Referring now to FIG. 3, a flow diagram depicts a process for manufacture of an information handling system with an image traits definition. The process begins at step 336 with creation of an information handling system image. At step 338, the image is communicated to a manufacturer for copying to an ordered information handling system. At step 340, the image is decompressed so that, at step 342, the settings are read with a registry template to identify the operating system, applications and custom configuration information of the image. At step 344, the information is mapped to adjust for any updates to the operating system and, at step 346, custom application information, such as forms and templates are read. At step 348, an image traits definition is created from the identified information to have adequate description of the image for subsequent re-creation of the image. At step 350, the image traits definition is communicated across a network, such as the Internet, to a manufacture site. At step 352, the image is recreated from the image traits definition and an image component library at the manufacture site so that the image mirrors the original image communicated to the manufacturer. At step 354, the re-created image is copied to manufactured information handling systems for shipment to the customer that defined the image.

Figure 4:
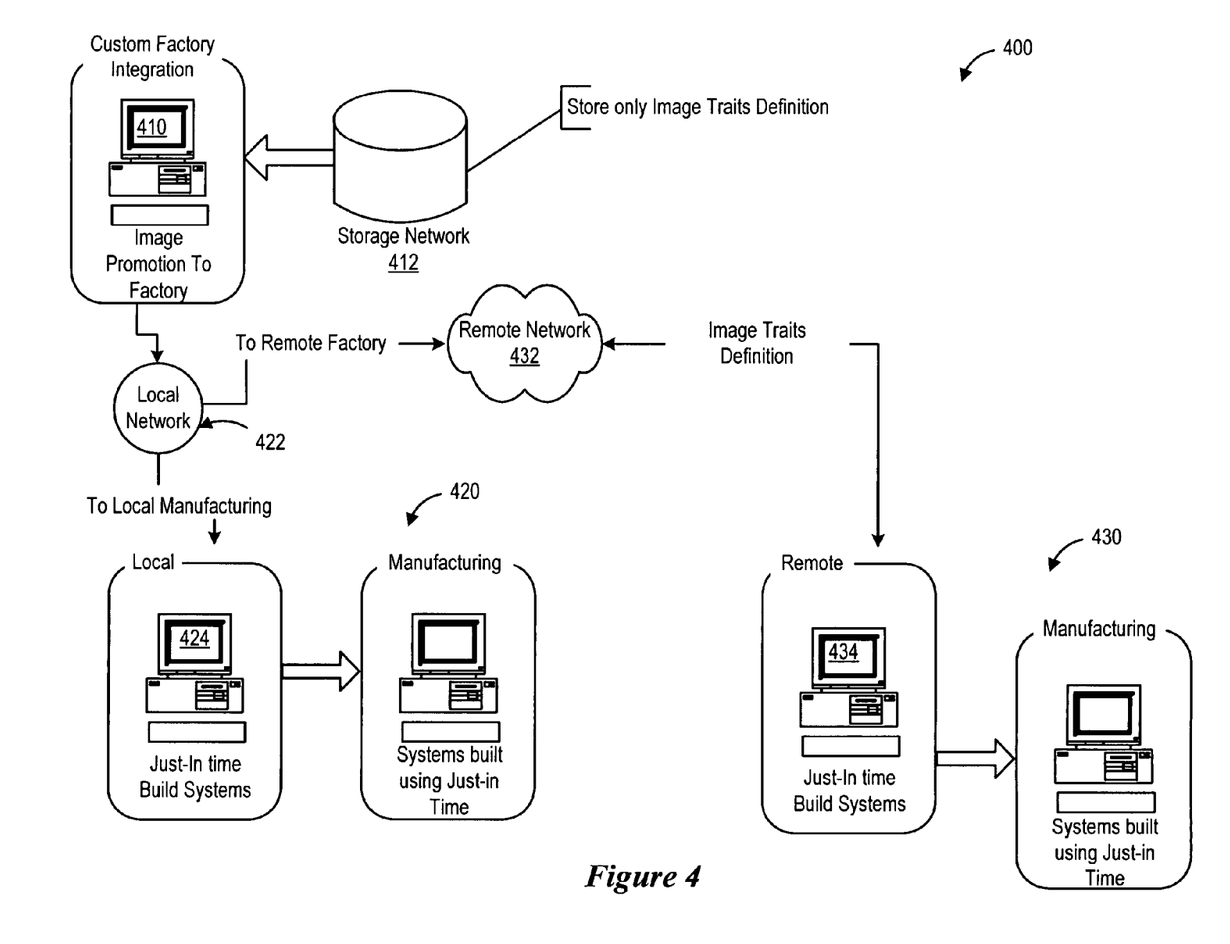
FIG. 4 depicts a block diagram of a system which includes local and remote manufacturing sites which use the image traits definition.

Referring not to FIG. 4, a block diagram depicts a system 400 which includes local and remote manufacturing sites which use the image traits definition 112. More specifically, the image traits definition 112 is developed during a custom factory integration process 410 and is stored on a storage network 412. The image traits definition 112 is then provided to a local manufacturing facility 420 via a local network 422. The local manufacturing facility includes local just in time build systems 424 that load images onto systems built using just in time manufacturing techniques.

The image traits definition 112 is also provided to a remote manufacturing facility 430 via a remote network, such as the Internet 432. The remote manufacturing facility 430 includes remote just in time build systems 434 that load images onto systems built using just in time manufacturing techniques. Because the image traits definition is substantially smaller than an actual image, the time to load provide the image traits definition to the remote manufacturing facility is substantially shorter than the time that would be required to transfer an actual image via a remote network.

Figure 5:
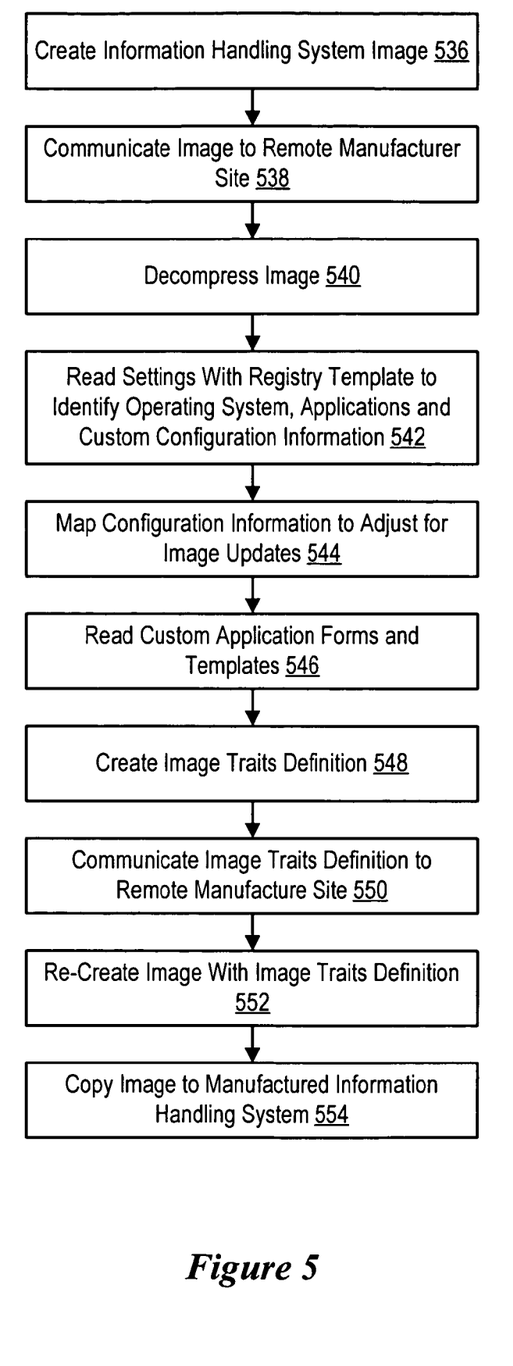
FIG. 5 depicts a flow diagram of a process for remote manufacture of an information handling system with an image traits definition.

Referring not to FIG. 5, a flow diagram depicts a process for remote manufacture of an information handling system with an image traits definition. The process begins at step 536 with creation of an information handling system image. At step 538, the image is communicated to a remote manufacturer site for copying to an ordered information handling system. At step 540, the image is decompressed so that, at step 542, the settings are read with a registry template to identify the operating system, applications and custom configuration information of the image. At step 544, the information is mapped to adjust for any updates to the operating system and, at step 546, custom application information, such as forms and templates are read. At step 548, an image traits definition is created from the identified information to have adequate description of the image for subsequent re-creation of the image. At step 550, the image traits definition is communicated across a network, such as the Internet, to a remote manufacture site. At step 552, the image is recreated from the image traits definition and an image component library at the manufacture site so that the image mirrors the original image communicated to the manufacturer. At step 554, the re-created image is copied to manufactured information handling systems for shipment to the customer that defined the image.

Although the present invention has been described in detail, it should be understood that various changes, substitutions and alterations can be made hereto without departing from the spirit and scope of the invention as defined by the appended claims.

What is claimed is:

1. A system for manufacture of information handling systems, the system comprising:
   an image analyzer configured to execute on a processor to accept an image and generate an image traits definition, the image traits definition having a manifest of the image's software characteristics and customization settings;
   storage interfaced with the image analyzer, the storage storing the image traits definition;
   a local network interfaced with the storage;
   a local image rebuilder interfaced with the local network and configured to execute on a processor to retrieve the image traits definition and apply the image traits definition to a local image components library to rebuild the image for local use;
   a remote network interfaced with the storage;
   a remote image rebuilder distal to and interfaced with the image analyzer through the remote network, the remote image rebuilder configured to execute on a processor to retrieve the image traits definition and apply the image traits definition to an image components library to rebuild the image for remote use; and
   an information handling system burn rack proximate to the remote image rebuilder and configured to executed on a processor to copy the rebuilt image to a manufactured information handling system.

2. The system of claim 1 wherein the image analyzer comprises:

an image decompressor configured to execute on a processor to decompress the image;

a settings engine configured to execute on a processor to determine customization settings of the decompressed image and to store the settings in the image traits definition; and an application engine configured to execute on a processor to determine the software characteristics and to store the software characteristics in the image traits definition.

3. The system of claim 2 wherein customization settings comprise video resolution, network and power management settings.

4. The system of claim 2 wherein software characteristics comprise application names, application templates, application forms and application settings.

5. The system of claim 1 wherein the image traits definition is an XML file having a schema with plural elements.

6. The system of claim 5 wherein the elements comprise an operating system, application, operating system update, custom configuration and desktop setting elements.

7. The system of claim 1 wherein the image analyzer is proximate an information handling system manufacturer order site operable to receive images from customers.

8. The system of claim 1 wherein the image analyzer is proximate an information handling system customer site and operable to communicate the image traits definition with an information handling system order to an information handling system manufacturer order site.

9. A method for manufacture of an information handling system having an image, the method comprising:

creating the image to have an operating system, plural applications and unique information;

analyzing the image to create an image traits definition that identifies the operating system, plural applications and unique information;

storing the image traits definition in storage interfaced with a local area network;

communicating the image from the storage through the local area network to local image rebuilder to build the image from a component library for local use;

communicating the image traits definition over a remote network to a remote information handling system manufacture site;

re-creating the image at the remote information handling system manufacture site from the image traits definition and from a component library having the operating system and plural applications; and copying the re-created image to a manufactured information handling system.

10. The method of claim 9 wherein creating the image further comprises creating the image at a customer site and analyzing the image further comprises analyzing the image at a manufacturer order site.

11. The method of claim 10 further comprising shipping the manufactured information handling system to the customer site.

12. The method of claim 9 wherein creating the image further comprises creating the image at a customer site and analyzing the image further comprises analyzing the image at the customer site.

13. The method of claim 12 further comprising:

communicating the image traits definition from the customer site to a manufacturer order site;

re-creating the image at the manufacturer order site; and testing the re-created image before communicating the image traits definition to the manufacture site.

14. The method of claim 9 wherein the image traits definition is an XML file.

15. The method of claim 9 wherein the unique information comprises configuration settings and application templates and forms.

16. The method of claim 15 wherein the configuration settings comprise hard disc drive partitions, the operating system, applications, user profile information, video resolution, power management and network settings.

17. The method of claim 9 wherein the remote network comprises the Internet.

18. A method for manufacture of an information handling system with an image, the method comprising:

storing an image having an operating system for execution on an information handling system;

analyzing the image to create an image traits definition XML file, the image traits definition identifying the image operating system, applications and unique settings;

storing the image traits definition XML file;

deleting the image to retain only the image traits definition XML file;

receiving an order for an information handling having the image;

communicating the image traits definition over a network to a manufacture site;

re-creating the image at the manufacture site with the image traits definition; and copying the re-created image to an information handling system.

19. The method of claim 18 wherein the analyzing further comprises comparing a registry template with the registry of the image to determine at least some of the unique settings.

20. The method of claim 19 wherein analyzing further comprises determining templates and forms associated with at least one image application and storing the templates and forms as unique settings.

* * * * *